United States Patent [19]

Onuma et al.

[11] 4,289,220
[45] Sep. 15, 1981

[54] HYDRAULIC COUPLING WITH A LOCK-UP CLUTCH

[75] Inventors: Kiyoshi Onuma, Toyota; Hajime Arai, Aichi, both of Japan

[73] Assignee: Toyota Jidosha Kogyo Kabushiki Kaisha, Aichi, Japan

[21] Appl. No.: 84,431

[22] Filed: Oct. 12, 1979

[51] Int. Cl.³ .............................................. F16D 3/66
[52] U.S. Cl. .................................... 192/3.3; 192/106.2
[58] Field of Search ..................... 192/3.28, 3.29, 3.3, 192/3.33, 106.2, 106.1; 60/338, 347

[56] References Cited

U.S. PATENT DOCUMENTS

| | | | |
|---|---|---|---|
| 3,497,043 | 2/1970 | Leonard | 192/3.3 X |
| 4,027,757 | 6/1977 | Radke et al. | 192/3.29 X |
| 4,138,003 | 2/1979 | Malloy | 192/3.29 |

Primary Examiner—George H. Krizmanich
Attorney, Agent, or Firm—Birch, Stewart, Kolasch & Birch

[57] ABSTRACT

The present invention is directed to a hydraulic transmission such as a fluid torque converter equipped with a lock-up clutch, including a housing having a front wall portion with a disk-shaped end wall portion and a rear portion formed as an impeller, a turbine provided between the front wall portion and the impeller, and a disk provided between the end wall portion and the turbine. The disk is adapted to cooperate with the end wall portion thereby providing the lock-up clutch, wherein a buffering means which effects a buffering driving connection between outer peripheral portions of the disk and the turbine is provided in an annular space left between the front wall portion of the housing and the outer peripheral portion of the turbine.

8 Claims, 8 Drawing Figures

HYDRAULIC COUPLING WITH A LOCK-UP CLUTCH

BACKGROUND OF THE INVENTION

The present invention relates to a transmission for automobiles, and more particularly to a hydraulic transmission equipped with a lock-up clutch.

A fluid torque converter such as is now widely used for a hydraulic transmission for automobiles comprises an impeller connected to the engine output shaft, a turbine connected to the input shaft of a gear transmission mechanism, and a stator adapted to deflect the flow of fluid which returns from said turbine to said impeller in order to effect torque conversion between the engine output shaft and the input shaft of the gear transmission mechanism, according to the difference between the rotational speed of said output shaft and said input shaft, while transmitting rotational power. In this torque converter, there exists inevitably a slippage between the impeller and the turbine even under the optimum operating condition where the rotational speed of the turbine has almost approached the rotational speed of the impeller. This slippage lowers the power transmission efficiency as compared with that of direct power transmission by a mechanical clutch. This results in poor fuel consumption of the automobile, which leads to problems regarding economy of petroleum and quality of exhaust gas.

In order to solve these problems, a hydraulic transmission system equipped with a lock-up clutch has been proposed. This system includes in parallel a hydraulic transmission, as, for example, a torque converter, and a friction clutch, the latter being adapted to be selectively actuated for effecting direct transmission, according to the operational condition of the automobile.

Various types of hydraulic transmissions with lock-up clutches have been proposed, including a typical one disclosed in U.S. Pat. No. 3,338,358 and our former proposal set forth in U.S. Pat. No. 4,108,289. However, one problem concerned with these known types of hydraulic transmissions having lock-up clutches is that the axial length of the transmission becomes substantially longer than that of a corresponding hydraulic transmission having no lock-up clutch, due to the fact that the lock-up clutch is contained in a transmission housing which encloses a turbine and stator in its front portion and provides an impeller by its rear portion. The lock-up clutch is positioned between the front end wall of the housing and the turbine and generally includes a piston or diaphragm which operates as a hydraulic actuator for the lock-up clutch and a clutch disk, axially arranged in sequence. In particular, when a buffering means is incorporated in the clutch disk so as to lessen the shock caused at the engagement and disengagement of the lock-up clutch, the axial space required for mounting the clutch disk becomes substantially large, because such a buffering means generally includes one or two auxiliary disk members arranged axially in sequence and several coil springs incorporated in the assembly of the clutch disk and the auxiliary disk members along the peripheral portions of the auxiliary disk members. However, in the design of automobiles, it is often very important that the axial dimension of the hydraulic transmission should be limited without a certain relatively small axial length, and in view of this it is strongly desirable for a lock-up clutch to be incorporated in a hydraulic transmission without substantially increasing the overall axial length of the transmission.

SUMMARY OF THE INVENTION

It is therefore the object of the present invention to provide a hydraulic transmission with a lock-up clutch whose axial dimension is not substantially increased due to incorporation of the lock-up clutch, wherein, nevertheless, the lock-up clutch provides desirable buffering performance.

In accordance with the present invention, the above-mentioned object is accomplished by a transmission comprising: an input member; an output member; a housing mounted to said input member, said housing having a front wall portion including a cylindrical peripheral wall portion and a disk-shaped end wall portion and a rear portion formed as an impeller. The end wall portion includes an annular portion which operates as a first clutch member. A turbine is received in said housing between said end wall portion and said impeller and is drivingly connected to said output member. A disk is provided between said end wall portion of said housing and said turbine so as to define a first chamber between said disk and said end wall portion and a second chamber between said disk and said turbine, said disk having an annular portion which operates as a second clutch member. In addition, a buffering means is provided between outer peripheral portions of said disk and said turbine, said buffering means drivingly connecting said outer peripheral portions with each other. Finally, a first fluid passage is connected to said first chamber; and a second fluid passage is connected to said second chamber.

In the abovementioned structure of a transmission, an annular space which is left between an angularly shaped front wall portion, as seen in the sectional plane including the central axis of the transmission, of the transmission housing and a circularly shaped portion, similarly as seen in a sectional plane including the central axis of the transmission, of the turbine, is effectively utilized for mounting the buffering means to be incorporated in the clutch disk. By this arrangement, therefore, only a small additional axial dimension is required for mounting said disk between said end wall portion of said housing and said turbine and for defining said first and second chambers, which may be relatively thin chambers, at opposite sides of the disk.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENT

Figure 1:
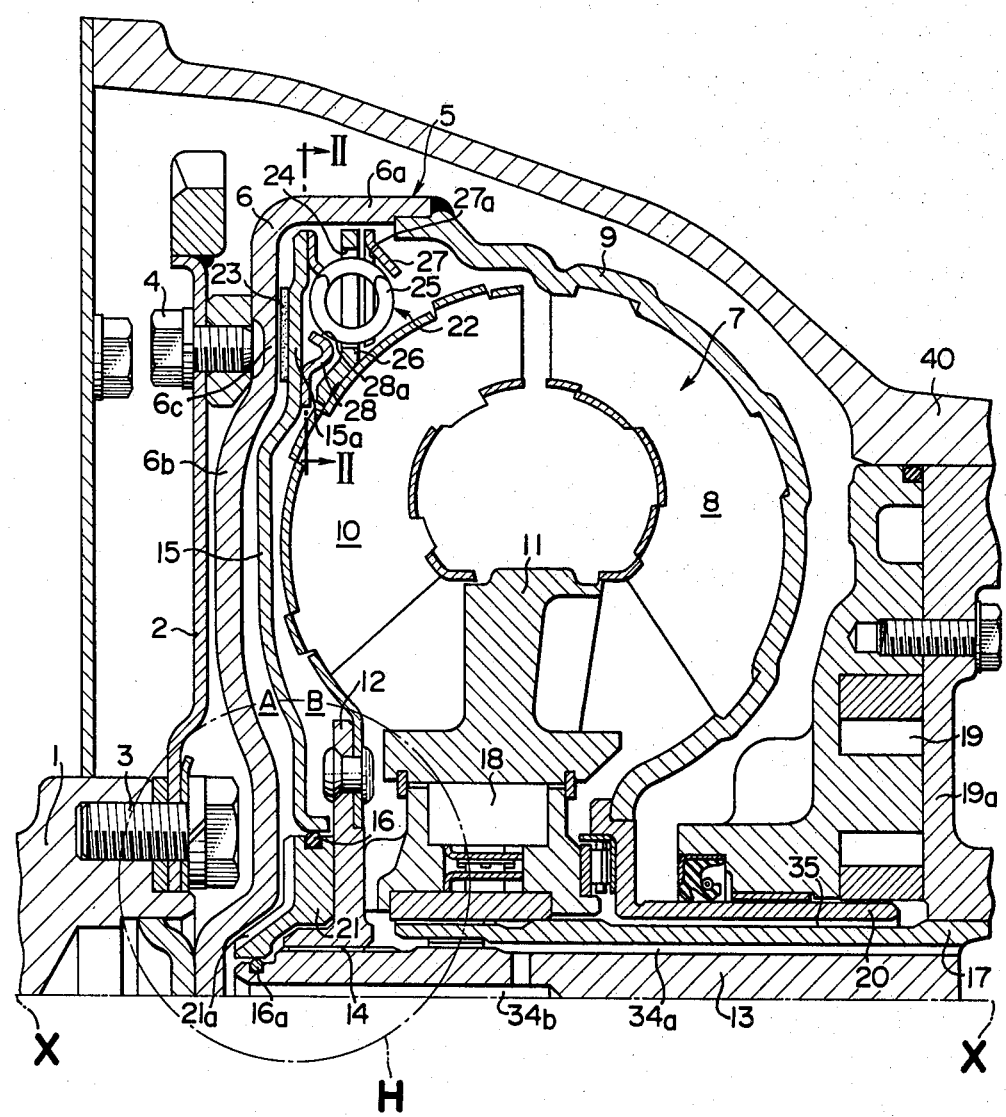
FIG. 1 is a longitudinal sectional view showing an embodiment of the hydraulic transmission with a lock-up clutch according to the present invention.
Figure 2:
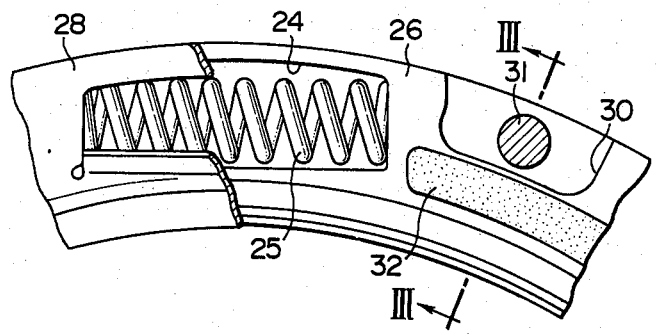
FIG. 2 is a partial sectional view along line II—II in FIG. 1.
Figure 3:
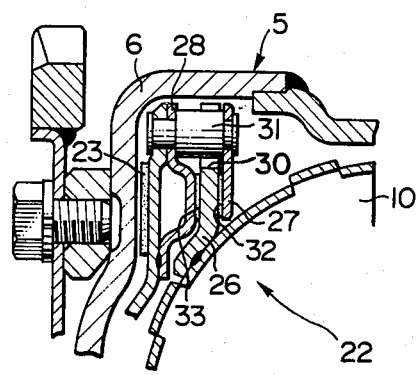
FIG. 3 is a partial sectional view along line III—III in FIG. 2.

Referring first to FIGS. 1–3, 1 designates a rear portion of an engine output shaft, to which is mounted a flywheel 2 by means of a plurality of bolts 3. The flywheel 2 is connected with a housing generally designated by reference numeral 5 by means of a plurality of bolts 4 so that the engine output shaft 1, the flywheel 2, and the housing 5 form a unitary structure which is rotatable around a central axis X—X. The housing 5 encloses the principal portions of the hydraulic transmission including a lock-up clutch, and simultaneously constitutes a principal transmission element which is driven around its axis X—X by input power supplied through its input member, which is said engine output shaft 1. The housing 5 includes a front wall portion 6 connected with the flywheel 2 by the bolts 4 and a rear pump housing portion 9 which forms an impeller 8 of a fluid torque converter generally designated by 7. The torque converter 7 includes as usual a turbine 10 and a stator 11. The turbine 10 includes a turbine disk 12 which is mounted on an output shaft 13 extending along the axis X—X by means of a spline connection 14. An annular hub member 21 is mounted to the annular root portion of the turbine disk 12.

The inner peripheral portion of the annular hub member 21 is in sealing engagement with the forward end portion (left end portion) of the output shaft 13 with interposition of an annular seal element 16a. The outer peripheral portion of the annular hub member 21 is in sealing engagement with a flange-shaped inner peripheral portion of an annular disk element 15 which is explained in detail hereinunder, by way of an annular seal element 16. The rear end portion (right end portion in FIG. 1) of the output shaft 13 is formed as an input shaft of a planetary gear transmission, which is omitted in the drawing for the purposes of simplicity. A sleeve 17 is provided around the output shaft 13, said sleeve being supported, via an oil pump housing 19a, by an outside housing 40 which in turn is supported by the body of an automobile. Upon the sleeve 17, the stator 11 is supported by way of a one-way clutch 18 in a conventional manner. A rear end portion of the housing 5 which constitutes the impeller 8 is further connected with a hollow shaft 20 which serves as the drive shaft of an oil pump 19, again in a conventional manner.

The front wall portion 6 of the housing 5 includes a cylindrical peripheral wall portion 6a and a disk-shaped end wall portion 6b. Between the end wall portion 6b and the turbine 10 is provided the aforementioned disk 15 as supported at its central bore portion by the annular hub member 21 and at its peripheral portion by the turbine 10 in the below-mentioned manner, so as to be aligned with the central axis X—X. The outer diameter of the disk 15 is slightly smaller than the inner diameter of the cylindrical peripheral wall portion 6a, so that axial shifting of the peripheral portion of the disk 15 relative to the housing 5 is allowed. The end wall portion 6b of the housing has an annular portion 6c which operates as a first clutch member. On the other hand, the disk 15 has an annular portion 15a which operates as a second clutch member which confronts and cooperates with said first clutch member provided by the annular portion 6c. In the shown embodiment, an annular friction layer element 23 is attached onto the annular portion 15a of the disk 15. Further, by the disk 15 provided between the end wall portion 6b and the turbine 10, a first chamber A is defined between the disk 15 and the end wall portion 6b, while a second chamber B is defined between the disk 15 and the turbine 10.

Between the front wall portion 6 of the housing 5, which includes the cylindrical peripheral wall portion 6a and the disk-shaped end wall portion 6b, and which has an angular shape when viewed in a longitudinal sectional view such as FIG. 1, and the turbine 10, which has an arcuate outer shape when viewed in the same longitudinal sectional view, is left an annular space, in which is provided a buffering means which is generally designated by 22. In the shown embodiment, the buffering means 22 has a first annular plate element 26, which is, at its inner peripheral portion, firmly connected to an outer peripheral portion of the turbine 10 by, for example, welding. The annular plate element 26 is formed with first and second circumferentially elongated openings 30 and 24. It is desirable that these first and second openings should be respectively provided in a plurality of locations along the circumference of the annular plate element 26.

On opposite sides of the annular plate element 26 are arranged second and third annular plate elements 27 and 28 which are adapted to frictionally engage the opposite faces of the first annular plate element 26. These second and third annular plate elements 27 and 28 are connected with each other by a pin 31, which is passed through the first opening 30 so as to allow for a predetermined frictional relative rotary movement between the first annular plate element 26 and the combination of the second and third annular plate elements 27 and 28. It is also desirable that the pin 31 should be provided in a plurality of locations along the circumference of the annular plate elements 26, 27, and 28. In the shown embodiment, friction layer elements 32 and 33 are mounted onto the opposite faces of the first annular element 26, so that the frictional engagement between the first annular plate element 26 and the second and third annular plate elements 27 and 28 is effected by way of these friction layer elements.

A compression coil spring 25 is provided in the second opening 24 of the first annular plate element 26 and openings 27a and 28a are, respectively, formed in the annular plate elements 27 and 28, corresponding to the second opening 24. In this case, one end of the spring is supported by the first annular plate element 26, while the other end of the spring is supported by at least one of the second and third annular plate elements 27 and 28, so as to exert a resilient biasing force which rotates the first annular plate element 26 relative to the combination of the second and third annular plate elements 27 and 28 in one direction. This biasing action is given a hysteresis characteristic by the frictional engagement between the first annular plate element 26 and the combination of the second and third annular plate elements 27 and 28.

The combination of the second and the third annular plate elements 27 and 28 is connected to the outer peripheral portion of the disk 15 by the pin 31 as well as by welding, so that the disk 15 and the turbine 10 are drivingly connected with each other at their outer peripheral portions by the buffering means 22. In this connection, the outer peripheral portion of the turbine 10, which is rigidly supported at its inner peripheral portion by the turbine disk 12, is slightly elastically deformable in the axial direction relative to the housing 5. Therefore, the outer peripheral portion of the disk 15 connected with the outer peripheral portion of the turbine 10 by way of the buffering means 22 can shift forward or backward along the central axis X—X relative to the end wall portion 6b of the housing 5 so as to engage or disengage the lock-up clutch provided by the annular portions 6c and 15a.

When the lock-up clutch composed of the annular portions 6c and 15a and the annular friction layer element 23 is to be disengaged so that power transmission is effected through the fluid torque converter 7, the line pressure of the associated oil pressure control system (not shown) is supplied through an annular passage 34a formed between the output shaft 13 and the stator shaft 17 and through a central passage 34b formed in the output shaft 13 to the first chamber A. In this connection, as shown in FIG. 1, the annular hub member 21 is formed with a groove (or grooves) 21a which provides a passage for conducting oil from the passage 34b to the chamber A. The oil supplied into the chamber A flows radially outwardly through the annular clearance formed between the annular portion 6c and the annular friction layer element 23 so as to be conducted into the space formed on the rear side (right side in FIG. 1) of the disk 15, while the oil flow pressurized at the line pressure in the chamber A exerts on the disk 15 a force large enough to shift it rightward in the figure against the reaction force acting on the turbine, so as positively to disengage the lock-up clutch. The oil introduced into the space on the rear side of the disc 15 is circulated through the fluid torque converter 7 and finally discharged through an annular passage 35 formed between the stator shaft 17 and the hollow rotary shaft 20.

By contrast, when the lock-up clutch is to be engaged, an oil circuit control means in the associated oil pressure control system (not shown) is changed over so that oil, generally at a pressure level lower than the line pressure, is supplied towards the fluid torque converter 7 through the passage 35, while the passage 34a is connected to an exhaust passage. In this case, as the pressure is built up in the fluid torque converter 7 and since the chamber B is in communication with the inside space of the fluid torque converter 7 through the clearance passage provided between the impeller 8 and the turbine 10 and through the perforated structure of the buffering means 22, said pressure is also built up in the chamber B, the disk 15 is urged leftwards in the figure, so that it shifts leftwards until the friction layer element 23 is tightly pressed against the annular portion 6c, thus engaging the lock-up clutch.

Although in this case the buffering means is so constructed that it connects the outer peripheral portions of the disk 15 and the turbine 10 with no substantial resiliency with regard to their axial movement, so that the axial shifting of the annular portion 15a serving as a clutch member is allowed by the resilience of the turbine disk 12, the normal clearance between the annular portion 6c and the annular friction layer element 23 during disengagement of the lock-up clutch is very small, as 0.5 mm, and therefore the axial shiftability of the peripheral portion of the disk 15 is easily available.

Figure 4:
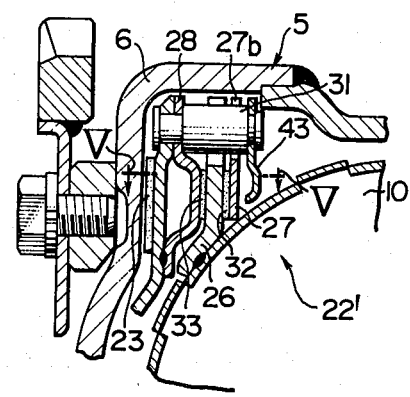
FIG. 4 is a view similar to FIG. 3, showing a modification of the structure shown in FIG. 3.
Figure 5:
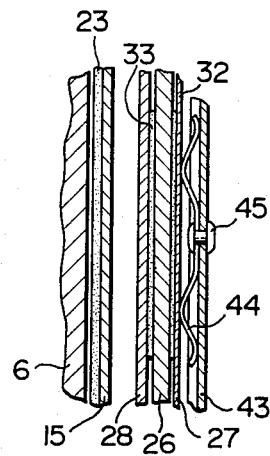
FIG. 5 is a partial sectional view along the line V—V in FIG. 4.

FIG. 4 is a view similar to FIG. 3, showing as 22' a modification of the above-explained buffering means 22, and FIG. 5 is a partial sectional view along the line V—V in FIG. 4. In this modification, the annular plate element 27 is not tightly connected with the pin 31, as in the embodiment shown in FIGS. 1-3, but is loosely engaged with the pin 31 at its opening 27b, so that the annular plate element 27 and the pin 31 are shiftable relative to each other along the axis of the pin 31 within a limited distance. In this case, the shifting of the annular plate element 27 in the direction of pivoting from the annular plate element 28 is limited by an annular plate element 43 which is firmly connected with the pin 31. As shown in FIG. 5, a corrugated leaf spring 44 is provided between the annular plate elements 27 and 43 in a manner of elastically pressing the annular plate element 27 against the annular plate element 26, while allowing for the shifting of the annular plate element 27 towards the annular plate element 43 within a limit under compression of the spring 44. In this structure, therefore, the frictional engagement between the annular plate element 26 and the combination of the annular plate elements 27 and 28 is effected by the annular plate elements 27 and 28 being pressed towards each other so as to sandwich the annular plate element 26 under the spring force of the spring 44, while, on the other hand, when the disk 15 is shifted forwards so as to establish engagement of the lock-up clutch, the relative axial movement required between the disk 15 and the turbine 10 is provided by the annular plate element 26, together with the annular plate element 27, being shifted relative to the pin 31 in its axial direction under compression of the spring 44, without relying upon the flexible deformation of the turbine 10. The spring 43 is mounted to the annular disk element 43 by a rivet 45.

Figure 6:
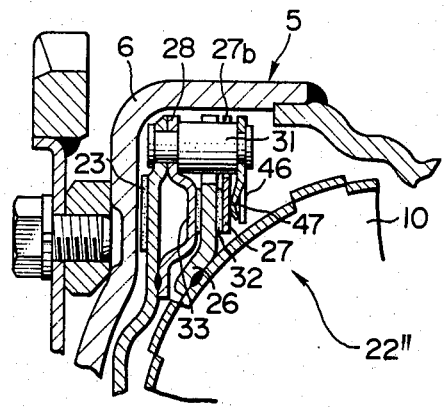
FIG. 6 is a view similar to FIGS. 3 and 4, showing still another modification of the structure shown in FIG. 3.
Figure 7:
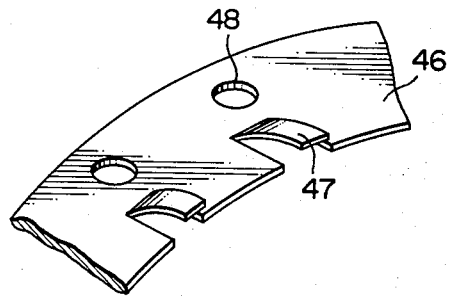
FIG. 7 is a perspective view of a part of an element incorporated in the structure shown in FIG. 6.

FIG. 6 is a view similar to FIGS. 3 and 4, showing as 22" still another modification of the buffering means. In this case, the buffering means 22" includes an annular plate element 46 which has spring portions 47 provided along its inner peripheral portion by part of it being cut and raised as shown in FIG. 7. The annular plate element 46 is fixedly connected with the pins 31 at openings 48 with its spring portions 47 facing and contacting the annular plate element 27, which, in the same manner as the annular plate element 27 in the buffering means 22' shown in FIG. 4, is loosely connected with the pins 31 so as to be shiftable relative to the pins 31 within a limited distance in the axial direction of the pins 31. The spring portions 47 in the modification shown in FIG. 6 operate in the same manner as the spring 44 in the buffering means 22' shown in FIGS. 4 and 5. In FIG. 6, the portions corresponding to those shown in FIGS. 3 and 4 are designated by the same reference numerals as in FIGS. 3 and 4, and operate in the same manner.

Figure 8:
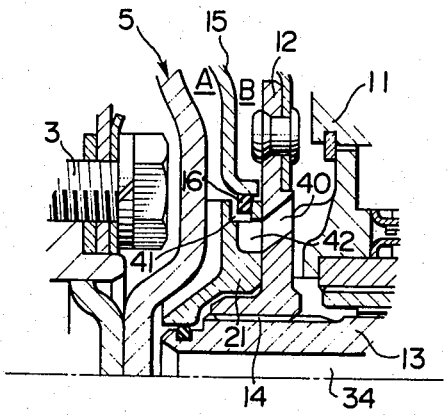
FIG. 8 is a partial sectional view corresponding to the part designated by "H" in FIG. 1, showing a modification of the structure of the hub member.

FIG. 8 is a partial sectional view corresponding to the part "H" of FIG. 1, showing a modification of the structure of the annular hub member 21 and the turbine disk 12. In this case, the outer peripheral portion of the annular hub member 21 is formed with an annular groove 41 whose axial width is slightly larger than that of the annular seal element 16 attached to the flange-shaped inner peripheral portion of the annular disk element 15. Further, the diameter of the bottom portion of the annular groove 41 is slightly smaller than the diameter of the inner peripheral portion of the annular seal element 16, so that an annular space is left between the bottom portion of the annular groove 41 and the inner peripheral portion of the annular seal element 16. The turbine disk 12 is further formed with a passage 42, which communicates to the abovementioned annular clearance at its one end, while it communicates to a passage 40 formed in the turbine disk 12 at its other end. By this arrangement, when the line pressure is supplied to the chamber A so as to disengage the lock-up clutch and to operate the torque converter in the normal hydraulic torque-converting manner, part of the oil introduced into the chamber A is conducted through the annular clearance formed between the annular portion 6c of the housing 5 and the annular friction layer element 23 so as to be supplied to the oil circulating through the impeller, the turbine, and the stator, while the remaining part of the oil is conducted through the passage provided by the groove 41, the passage 42, and the passage 40 so as to be supplied to the abovementioned circulating oil flow. When the lock-up clutch is to be engaged, as the annular disk element 15 is shifted forward or leftward in the figure, the annular seal element 16 engages the left side wall of the groove 41, so that, in this case, a passage through the passages 40 and 42 is connected with the chamber B. When an oil passage such as formed by the groove 41 and the passages 42 and 40 is provided during the torque transmitting operation of the torque converter, overall fluid circulation through the torque converter is readily increased to such a high level that the torque converter is maintained at low temperature even when it is operated continuously for a long time.

From the foregoing, it will be appreciated that, in accordance with the present invention, a lock-up clutch including a buffering means required for lessening the shock which will occur in engagement and disengagement of the lock-up clutch can be incorporated in the housing of a fluid torque converter without substantially increasing the axial dimension of the transmission device.

Although the invention has been shown and described with respect to a preferred embodiment thereof, it should be understood that various changes and omissions of the form and the detail thereof may be made therein by one skilled in the art without departing from the scope of the invention.

We claim:
1. A transmission comprising:
an input member;
an output member;
a housing mounted to said input member, said housing having a front wall portion including a cylindrical peripheral wall portion, a disk-shaped end wall portion and a rear portion formed as an impeller, said end wall portion having an annular portion which operates as a first clutch member;
a turbine received in said housing between said end wall portion and said impeller and drivingly connected to said output member;
a disk provided between said end wall portion of said housing and said turbine so as to define a first chamber between said disk and said end wall portion and a second chamber between said disk and said turbine, said disk having an annular portion which operates as a second clutch member;
a buffering means provided between outer peripheral portions of said disk and said turbine, said buffering means drivingly connecting said outer peripheral portions with each other;
a first fluid passage for communicating fluid to said first chamber; and
a second fluid passage for communicating fluid to said second chamber;
said buffering means comprises a first annular plate element mounted to said outer peripheral portion of said turbine and having first and second circumferentially elongated openings, second and third annular plate elements having individually third and fourth circumferentially elongated openings and frictionally engaged on opposite faces of said first annular plate element and connected with each other by a pin which is passed through said first opening so as to allow for a predetermined frictional relative rotary movement between said first annular plate element and the combination of said second and third annular plate elements; and a compression coil spring located in said second, third, and fourth opening so as to be supported and to effect a buffering connection between said first annular plate element and the combination of said second and third annular plate elements, said disk being directly connected to the combination of said second and third annular plate elements so as to be bufferingly connected to said turbine through the assembly of said first, second, and third annular plate elements and said coil spring.

2. The transmission of claim 1, wherein a friction layer element is provided between said first and second clutch members.

3. The transmission of claim 1, wherein said disk is connected with the combination of said second and said third annular plate elements by way of said pin.

4. The transmission of claim 1, wherein said third annular plate element is shiftable relative to said pin in the axial direction of said pin within a limited distance, and a spring is provided which resiliently biases said third annular plate element towards said second annular plate element.

5. The transmission of claim 4, wherein a fourth annular plate element is provided so as to limit the shifting of said third annular plate element relative to said pin.

6. The transmission of claim 5, wherein said spring is an independent element and is supported by said fourth annular plate element.

7. The transmission of claim 5, wherein said spring is an integral part of said fourth annular plate element.

8. The transmission of claim 1, wherein said turbine and said disk have individually hub portions, said hub portions incorporating an oil passage which opens when the pressure in said first chamber becomes higher than that in said second chamber.

* * * * *